United States Patent [19]

Morrison

[11] 4,017,058
[45] Apr. 12, 1977

[54] RETAINER FOR SEAT RING ON GATE VALVE

[75] Inventor: Bert L. Morrison, Houston, Tex.

[73] Assignee: ACF Industries, Incorporated, New York, N.Y.

[22] Filed: Nov. 5, 1975

[21] Appl. No.: 628,871

[52] U.S. Cl. .............................. 251/328; 251/360
[51] Int. Cl.² ......................................... F16K 3/02
[58] Field of Search ........... 251/328, 363, 360, 362

[56] References Cited

UNITED STATES PATENTS

| | | | |
|---|---|---|---|
| 2,776,813 | 1/1957 | Blackman | 251/328 X |
| 3,207,471 | 9/1965 | Williams | 251/328 |
| 3,285,565 | 11/1966 | Barnier et al. | 251/328 |
| 3,362,680 | 1/1968 | Weiss | 251/360 |
| 3,937,442 | 2/1976 | Martin et al. | 251/328 |

FOREIGN PATENTS OR APPLICATIONS 53,501   6/1967   Poland .............................. 251/328

*Primary Examiner*—Arnold Rosenthal
*Attorney, Agent, or Firm*—Richard M. Byron

[57] ABSTRACT

A gate valve seat ring retainer particularly for a nonported gate valve comprising an annular seat ring mountable in a seat pocket around the flow passageway in a gate valve body. A recess in the valve body opens into the flow passageway in a spaced relation to the seat pocket. An elongated retainer extending in the flow passageway has one end portion secured to the seat ring and the opposite end portion engaged in the recess to hold and retain the seat ring in place in the gate valve body.

14 Claims, 6 Drawing Figures

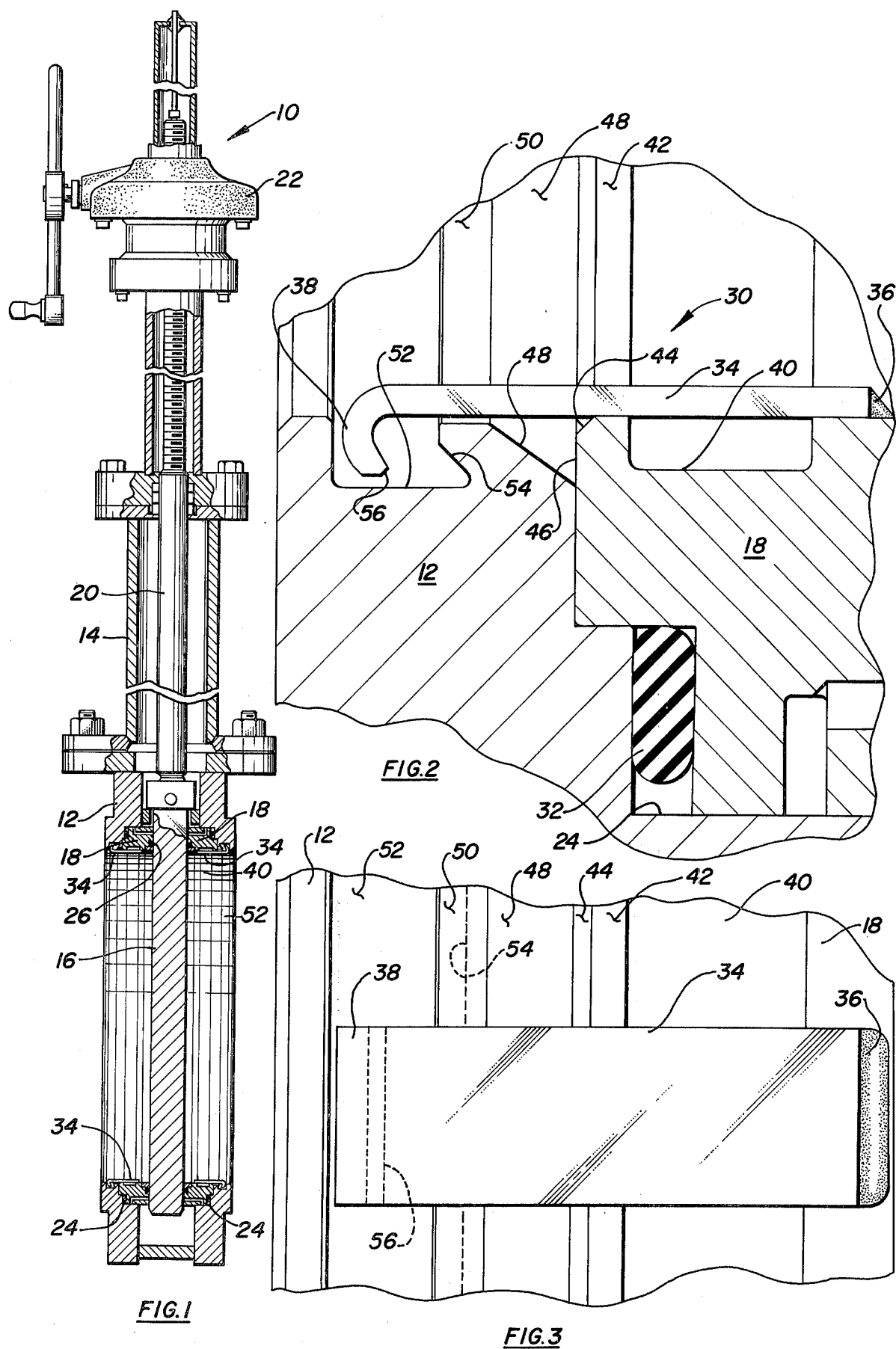

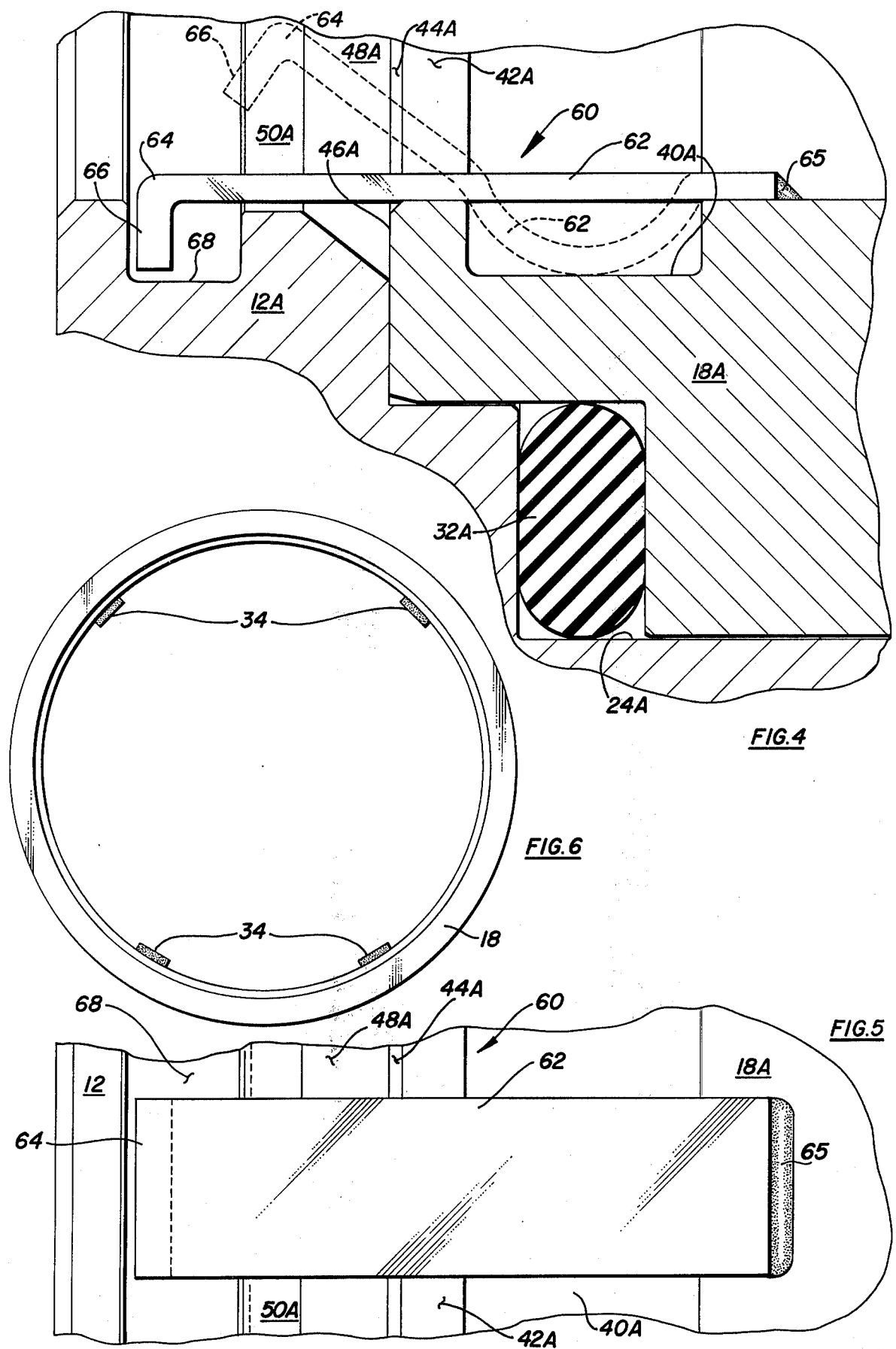

RETAINER FOR SEAT RING ON GATE VALVE

BACKGROUND OF THE INVENTION

In ported type style gate valve bodies the seat ring is pressed into an annular groove in the valve body. In non-ported style gate valve bodies a seat pocket is formed in the body and opens to the flow passageway so the seat ring when inserted has its interior portion opening to the flow passageway through the valve body. In the prior art seat rings for non-ported valve bodies have been typically pressed in place and retained by an interference fit between the valve body and the exterior of the seat ring or they are threadedly mounted in the body. While pressing in the seat ring is desirable and acceptable in small valves, it is unacceptable in the larger pipeline size valves which have an internal diameter from between one foot to five feet and larger.

Retaining the seat rings in large gate valve bodies is a perplexing problem in the art particularly during assembly and servicing of the valves because the seats must be kept in place while the gate is installed. During use of such a valve, the seats must be kept in place as the gate moves between open and closed position and during high velocity flow.

Retaining clips are known in the arts to retain seat rings in place, however they consist of wire clips which are inserted into the bonnet and secure edge portions of the seat ring where they extend beyond the valve body toward the gate. This type of structure is not usable in the instance where the seat ring does not extend past the body toward the gate or extends only a slight amount past the body. Another seat ring retainer structure involves the placing of a lug at a bottom portion of the valve body at a point where it will support the gate side of the seat ring at a point where it will not interfere with the motion of the gate, and mounting a removable lug in an upper portion of the valve body in a position extending over an upper portion of the seat ring. While this particular structure is adequate, the removably mounted lug is difficult, if not impossible, to remove and replace after a valve has been in service for some time. Other seat retaining structures are known which incorporate a plurality of lugs about the interior of the valve body to retain the seat ring in combination with a fourth lug or supporting structure on the valve bonnet. No specific device is known in the art which secures the seat ring to the valve body by using a fastener structure positioned on the interior of the flow passageway of the valve body.

SUMMARY OF THE INVENTION

This invention is related to a retainer structure for securing the seat ring in the body of a gate valve, particularly a non-ported gate valve. The retainer structure comprises an annular seat ring mounted in a seat pocket about the flow passageway in a gate valve body. A recess in the valve body opens into the flow passageway and is spaced longitudinally of the flow passageway in close relation to the seat pocket. An elongated retainer positioned within the passageway has one end portion secured to the seat ring and the opposite end portion engaged in the recess to hold and retain the seat ring in place in the gate valve body.

One object of this invention is to provide a seat retainer structure for non-ported gate valves which overcomes the aforementioned disadvantages of the prior art devices.

Still, one other object of this invention is to provide a seat ring retaining structure for gate valves which has a retainer positioned generally within the flow passageway through the valve body for retaining the seat ring in a seat pocket in the body.

Still, another object of this invention is to provide a seat ring retainer for non-ported gate valves which will function to retain the seat ring in place yet which will allow the seat ring to be easily removed from the valve structure for a replacement or repair of the seat rings.

Yet, another object of this invention is to provide a seat ring retainer for a nonported gate valve which has a clip member secured to an interior portion of the seat ring and extending in the flow passageway of the valve to a recess in the flow passageway of the valve body.

Various other objects, advantages, and features of this invention will become apparent to those skilled in the art from the following discussion, taken in conjunction with the accompanying drawings, in which:

DESCRIPTION OF THE DRAWINGS

FIG. 1 is a cutaway elevation view of a slab gate valve embodying one embodiment of the seat retainer of this invention on both the upstream and downstream seat rings;

FIG. 2 is an enlarged elevation view of the seat ring retainer shown in FIG. 1 in full view with a portion of a valve body and a portion of a seat ring shown in cross-section;

FIG. 3 is a plan view of the embodiment of the seat ring retainer in FIGS. 1 and 2 with the view taken from within the flow passageway of the valve and including a portion of the valve body and the seat ring;

FIG. 4 is an enlarged elevation view of another structural embodiment of the seat ring retainer of this invention shown in full view with a portion of a valve body and a portion of a seat ring shown in cross section. The retainer member is shown in solid lines in a normal use position and shown in dashed lines in a bent position for removal of the seat ring from the valve body;

FIG. 5 is a plan view of the embodiment of the seat ring retainer member shown in FIG. 4 with the view taken from a point inside the flow passageway of the valve and including a portion of the valve body and the seat ring; and FIG. 6 is an elevation view of a seat ring having a plurality of the seat ring retainers of this invention, with the view taken from the gate side of the seat ring.

The following is a discussion and description of preferred specific embodiments of the seat ring retainer structure of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Referring in detail and in particular to FIG. 1 wherein a gate valve, generally indicated at 10, is shown in a cutaway view and utilizing the seat ring retainer of one embodiment of this invention. Gate valve 10 includes a body 12 having a bonnet 14 mounted thereon and enclosing a slab gate 16 moveably mounted between a pair of seat rings 18. Gate 16 has a stem 20 mounted thereto and extending through bonnet 14 and connected with an operator 22. Seat rings 18 are individually mounted in seat pockets 24 in opposing sides of body 12 around the flow passageway of the valve. Gate 16 slides between resilient seals 26 located on facing sides of seat rings 18.

FIG. 2 shows a portion of valve body 12 and seat ring 18 in an enlarged cross-sectional view along with the embodiment of the seat ring retainer structure shown in FIG. 1 indicated generally at 12. Seat ring 18 fits into seat pocket 24 as shown with only an inner portion thereof extending inward from the valve body. An O-ring 32 is positioned around the perimeter of seat ring 18 and located in an outer portion of seat pocket 24. Seat ring 18 can move in seat pocket 24 to the right and left as it is shown in FIG. 2. Seat ring retainer structure 30 includes a retainer member or clip 34 which is secured to seat ring 18 and extends through the valve body flow passageway into a recess in valve body 12.

Seat ring retainer 34 is an elongated member secured at one end and having a hook-like portion on its opposite free end. The secured end of retainer member 34 is welded to a mid-portion of seat ring 18 at weld joint 36. Through the mid-portion of retainer member 34 it is essentially straight. The outer free end portion of retainer member 34 is provided with an outwardly turned hook portion 38. Hook portion 38 turns outwardly relative to the valve flow passageway and in a reverse manner towards seat ring 18 as shown clearly in FIG. 2. Retainer member 34 by itself is a J-shaped member when seen from a narrow side edge. Seat ring 18 is provided with a recess in the form of a groove 40 through a mid-portion thereof and located underneath a mid-portion of retainer member 34. Retainer member 34 rests on the interior annular surface of seat ring 18. The secured end portion of retainer member 34 is mounted adjacent to the edge of groove 40. A mid-portion of retainer member 34 rests on an outer surface portion 42 of the inner annular surface of seat ring 18 as shown. Seat ring 18 is provided with a champhered edge surface 44 at the intersection of its outer annular surface portion 42 and its outer end surface portion 46. Valve body 12 is provided with an inclined or outwardly tapered portion 48 exposed to the flow passageway at the bottom portion of seat pocket 24. Inclined surface 48 joins the interior of the flow passageway at an annular surface 50. The recess for mounting the free end portion of retainer member 34 is an annular groove 52 in valve body 12 around the flow passageway as shown clearly in FIG. 2. Groove 52 has a recessed portion of relief portion 54 on the side thereof which is closest to seat pocket 24. The free end 56 of retainer member 34 is closer to seat ring 18 than the interior of the curved end portion 38 so that it will move into the groove relief portion 54 in the event seat ring 18 and retainer member 34 are moved to the right from the position shown in FIG. 2. Retainer member 34 is constructed of a resilient and flexible material which will allow the non-attached portion to deflect inwardly relative to the flow passageway as the free end portion 38 moves over inclined surface 48 when the seat ring is being installed in valve body 12. Once retainer free end portion 38 moves over inclined surface 48 and past annular surface 50, it moves outwardly in a spring-like action into groove 52.

It is to be noted that seat ring 18 is moveably mounted in seat pocket 24 so that O-ring 32 can be compressed as required for sealing between seat ring 18 and valve body 12. Clearance between seat ring 18 and seat pocket 24 allows sliding movement of seat ring 18 to the right and left as shown in FIG. 2 or inwardly and outwardly relative to the gate containing portion of valve body 12.

Seat ring 18 is constructed with retainer member 34 attached, then it is mounted in valve body 12. Preferably, a plurality of retainer members 34 are welded to seat ring 18 in a spaced relation as shown in FIG. 6. To install seat ring 18 in valve body 12, it is placed in alignment with seat pocket 24 with O-ring 32 being in place around the perimeter of seat ring 18. Once this is done, seat ring 18 is moved into seat pocket 24. As seat ring 18 moves into seat pocket 24 the free end portions of retainer members 34 contact inclined surface 48. The retaining free end portions 38 slide on inclined surface 48 and over surface 50 as seat ring 18 moves into its final resting position in seat pocket 24. Because the retainer members are constructed of flexible resilient material, the outer end portions snap into place in groove 52 as shown in FIG. 2 when they move past the end of surface 50. At this point it is to be noted that the retainer members are sufficiently long to allow movement of seat ring 18 in alignment with the flow passageway of valve body 12 with the retainer members hooked free end portions 38 engaging the innermost side of groove 52 to limit movement of seat ring 18 in the direction of the gate. Seat ring 18 is free to move within the limits of restraint imposed by retainer members 34 and by seat ring 18 bottoming in seat pocket 24. The specific distance seat ring 18 can move in a design factor and a matter of choice as far as the design of a specific valve is concerned.

In order to remove the seat ring from a valve which is installed in a conduit such as as a pipeline, bonnet 14, gate 16, stem 20, actuator 22, and any other associated structure must be removed to provide free access to the seat rings through the open upper portion of body 12.

For removing seat ring 18 from valve body 12, retainer member 34 can be easily bent to a position that will remove its free outer end portion 38 from engagement with groove 52. FIG. 4 shows in dashed lines a retainer member bent into such a position. Bending of retainer member 34 can be accomplished by forcibly depressing the mid-portion of retainer member 34 where it spans groove 40 thereby forming that portion of it into a somewhat U-shaped configuration. In doing this, the retainer member free end portion 38 is raised from groove 52 to the position substantially as shown by the other retainer illustrated in FIGS. 4 and 5. In order to bend retainer members 34, an elongated tool can be inserted through the gate body opening, located on the mid-portion of retainer members in the lower portion of the valve, and then forced downwardly to bend the retainer members. For retainer members which are positioned in the upper portion of the valve seat, a tool having an upwardly turned hook portion can be used to contact and bend the retainer members where they span groove 40. Once the retainer members on a seat ring have been bent as described, the seat ring can be moved from the seat pocket into the center open portion of the valve body previously occupied by the gate for removal. The same procedure is used in removing the other seat ring from the valve.

To install another seat ring in the valve body, it is lowered through the open portion of the valve body into a position aligning with seat pocket 24. Prior to placing the seat ring in the valve body an O-ring is positioned around the seat ring. Once the seat ring is located in the aligned position, it is moved into seat pocket 24 whereupon the free end portions of retainer members 34 move over surfaces 48 and 50 and engage in groove 52 as described above. The same procedure is used for installing the other or second seat ring in the valve body.

At this point, an important advantage of the seat ring retainer of this invention is to be noted. In field servicing of gate valves mounted in conduits, it is common to replace the seat rings while the valves are installed by removing the gate, bonnet and other associated structure so access can be had to the seats through the open center portion of the valve body. It is a difficult task to replace floating seats in large diameter non-ported gate valves (such as twelve inches diameter and larger) because of the tendency of the seats to move or fall inwardly into the open center portion of the valve body cavity where the gate is to be placed after the seats are installed. The floating seats are not rigidly secured to the valve body structure thus they move in the seat pockets and must be retained in the seat pockets by some means in a substantially recessed position so the gate can be inserted between the seat pockets. The retainer structure 30 of this invention retains the seats in a predetermined position in the seat pockets once the seat rings are installed so the gate can be inserted without difficulty between the seat rings. The retainer structure of this invention saves considerable time, effort and frustration on the part of the valve serviceman who must replace the seat rings in a large diameter valve. The particular structure of the retainer member allows the seat rings 18 to float in valve body 12 as required to effect a good seal between the seat rings and the gate, however it restrains their motions sufficiently to allow the gate to be inserted between the seat rings without difficulty.

Another important advantage of the seat ring retainer of this invention is that it can be used to control movement of the upstream seat when the valve is closed. The length of the retainer members can be selected so when the valve is closed, the upstream seat can move downstream sufficiently to maintain a good seal against the gate but not so far as to prevent unwanted displacement of O-rings or loss of seat sealing and lubricating compounds into the valve body. The retainer members limit movement of the seat rings toward the gate when the hook portion 38 thereof engages firmly with groove side 54. The retainer members 34 are designed such that minimum inward movement of seat ring 18 is necessary to maintain a good upstream seal against the gate and maximum inward movement is necessary to retain O-rings and sealing and lubricating compounds. It is to be noted that a clearance must be provided between the outer end portion of hook portion 38 and the side of groove 52 opposite to side 54 so retainer member 34 does not contact that side of the groove when seat ring 18 is in the bottom of seat pocket 24. Contact of the outer end portion of hook portion 38 and the side of groove 52 must be prevented to obviate inadvertent bending of retainer member 34.

Another specific embodiment of the seat ring retainer structure of this invention is shown in FIGS. 4 and 5. Some structural portions of this second embodiment are similar to the first described embodiment and numerals identifying these similar parts are followed by a capital A for clarity. FIG. 4 shows the seat ring retainer structure indicated generally at 60 and mounted with seat ring 18A in valve body 12A. Valve body 12A is provided with a seat pocket 24A having a shape corresponding to the exterior shape of seat ring 18A. An O-ring 32A is located between seat ring 18A and valve body 12A as shown.

Seat ring retainer structure 60 includes a retainer member 62 which is mounted on the inner annular portion of seat ring 18A. The mounted end portion of retainer member 62 is welded at a joint 65 to a mid-portion of the interior annular surface of seat ring 18A. Retainer member 62 extends from seat ring 18A over its inner annular surface and beyond to a point on the interior annular surface of valve body 12A. Retainer member 62 is open to the valve body flow passageway as shown in FIG. 4. Seat ring 18A is provided with a recess in the form of groove 40A underneath a mid-portion of retainer member 62. The mid-portion of retainer member 62 rests on seat ring inner annular surface 42A at the portion of the seat ring 18 which is adjacent to valve body 12 near the flow passageway. Seat ring 18A has a champhered surface 44A at the juncture of its outer end surface 46A and inner annular surface 42A. Valve body 12A has an inclined surface 48A joining seat pocket 24A and valve body inner annular surface 50A. Valve body 12A has a recess in the form of an annular groove 68 spaced from seat pocket 24A and opening to the flow passageway substantially as shown in FIG. 4.

Seat ring retainer 60 is constructed as shown in the solid lines in FIG. 4. Seat ring retainer member 62 is secured at one end and has a hook-like portion on its opposite free end portion 64. The secured end of retainer member 62 is welded to a mid-portion of seat ring 18A at weld joint 65. The mid-portion of retainer member 62 is essentially straight. Retainer free end portion 64 is provided with an outwardly turned end portion 66. Outwardly turned end portion 66 is essentially perpendicular to the flow passageway and to the longer portion of retainer member 62. Retainer member 62 is by itself an L-shaped member when seen from a narrow side edge. When seat ring 18A is installed in valve body 12A and fully depressed into seat pocket 24A, retainer member free end portion 66 is spaced from the innermost side of groove 68 so that seat 18A can move inward or toward the gate portion of valve body 12A. Retainer member 62 is constructed of a flexible and resilient material which will enable the non-attached portion thereof to flex as required for installation of seat ring 18A. A plurality of retainer members 62 are welded to the inner periphery of seat ring 18A in a manner similar to the embodiment shown in FIG. 6. In installation of valve seat 18A, it is placed in valve body 12A in alignment with seat pocket 24A and moved into the seat pocket. Retainer member free end portion 64 slides over inclined surface 48A and surface 50A as seat ring 18A is moved into seat pocket 24A until such a point as the outwardly turned portion 66 moves past surface 50 then it springs outwardly into groove 68. At this point in the installation of seat ring 18A, retainer member 62 effectively retains seat ring 18A in seat pocket 24A.

Removal of seat ring 18A from valve body 12A is accomplished by bending retainer member 62 into the shape as shown in dashed lines in FIG. 4. Bending retainer member 62 into this position is accomplished by pressing a blunt instrument on the side of retainer member 62 opposite groove 40A and pressing the blunt instrument so as to deform the mid-portion of retainer member 62 into groove 40A. By bending the mid-portion of retainer member 62 into groove 40A the retainer free end portion 64 is raised from groove 68 thereby releasing seat ring 18A from the restraint of seat ring retainer 60. Removal and replacement of seat rings in a valve is accomplished as described above for the embodiment of FIGS. 1-3. Because of the similarity, this discussion will not be repeated here for brevity.

In the use and operation of the seat ring retainer structure of this invention, it is seen that same provides a useful device for retaining seat rings in non-ported valves where replacement of the seat rings must be accomplished when the valves are installed in a conduit. The seat ring retainer structure of this invention fulfills a long felt need in the art for providing a simple, safe and easily removable seat ring retainer structure which can be used for valve servicing and assembling. The seat ring retainer structure is easy to use and requires no special tools for installation and only simple tools for removal. In using the seat ring retainer structure of this invention, it has been found that considerable time and effort can be saved particularly when assembling large diameter non-ported valves as described above.

In the manufacture of the seat ring retainer structure of this invention, it is obvious that the seat ring retainer can be easily constructed with non-ported gate valves to achieve the end product and result. The retainer member is extremely simple in construction and can be easily attached to seat rings. In manufacturing a valve and incorporating the seat ring retainer structure of this invention, only a few additional surfaces and elements must be provided and these can be easily accomplished by equipment already used to form machined portions of the valve body and seat ring structure and by simple fabricating devices.

What is claimed is:

1. A gate valve seat ring retaining means, comprising:
   a. an annular seat ring mountable in a gate valve body in an annular seat pocket around the flow passageway of said valve body and having an inner periphery in alignment with and forming generally a continuation of the flow passageway, said seat ring having an annular sealing portion on an inner side thereof to contact a gate in said valve body,
   b. a recess in said valve body opening into said flow passageway and located in a spaced relation to said seat pocket, and
   c. a retainer member having one end portion thereof rigidly secured to a mid-portion of the inner periphery of said seat ring, having an unsecured mid-portion thereof extending over and in contact with the adjacent inner periphery of the ring, and having an opposite free end portion thereof extending over an interior portion of said gate valve body in said flow passageway and engaged in said recess to in use hold and retain said seat ring in place in said gate valve body.

2. The gate valve seat ring retaining means of claim 1, wherein:
   a. said retainer member is an elongated member extending from said seat ring over an interior portion of said passageway in general axial alignment with said flow passageway, and
   b. said retainer free end portion has an outwardly turned hook portion engagable in said recess.

3. The gate valve seat ring retaining means of claim 2, wherein:
   a. said seat ring having a recess opening to said flow passageway and located laterally outwardly of a mid-portion of said retainer member to in use receive a midportion of said retainer member when said retainer member is bent outwardly in said mid-portion thereof for removal of said seat ring from said valve body,
   b. said hook portion has a smoothly curved shape turned outwardly relative to said flow passageway and turned generally toward said seat ring, and
   c. said first named recess has an inner relief portion on the portion thereof closest to said seat ring, said inner relief portion being constructed and adapted to receive a portion of said hook portion.

4. The gate valve seat ring retaining means of claim 2, wherein:
   a. said seat ring having a recess opening to said flow passageway and located laterally outwardly of a mid-portion of said retainer member to in use receive a midportion of said retainer member when said retainer member is bent outwardly in said mid-portion thereof for removal of said seat ring from said valve body, and
   b. said hook portion has an outwardly turned portion extending substantially perpendicular relative to said retainer member and engageable in said recess.

5. A gate valve, comprising:
   a. a gate valve body having an annular seat pocket around a flow passageway and having a gate movably mounted in said gate valve body for movement between open and closed positions relative to said flow passageway,
   b. a seat ring mounted in said annular seat pocket and having an annular sealing portion on one side thereof in contact with said gate, said seat ring having an inner periphery forming generally a continuation of the flow passageway,
   c. a recess in said valve body opening into said flow passageway and spaced closely from the seat ring in a direction axially of the flow passageway, and
   d. a seat ring retainer having one end portion secured to the inner periphery of said seat ring and extending longitudinally of the flow passageway to said recess, the opposite end portion of said retainer being free and extending outwardly within the recess to retain said seat ring in place in said gate valve body.

6. The gate valve of claim 5, wherein:
   a. said retainer is an elongated retainer member extending over an interior portion of said passageway and its opposite end portion has an outwardly turned hook portion, said hook portion being depressed inwardly upon initial insertion of the seat ring and snapping outwardly into engagement with the recess when transversely aligned therewith.

7. The gate valve of claim 6, wherein:
   a. said retainer member one end portion is secured to a center portion of the inner periphery of said seat ring and extends therefrom over an interior portion of said seat ring and further over a portion of the interior surface of said passageway, and
   b. said seat ring has a recess opening to said flow passageway and located underneath a mid-portion of said retainer member to in use receive a midportion of said retainer member when said retainer member is bent outwardly in said mid-portion thereof to facilitate removal of said seat ring from said valve body.

8. The gate valve of claim 6, wherein:
a. said first named recess comprises an annular groove in said valve body,
b. said seat ring has a plurality of said retainer members mounted thereon in a spaced relation.

9. The gate valve of claim 7, wherein:
a. said retainer member one end portion is welded to said seat ring,
b. said retainer member has an essentially straight mid-portion extending over said recess and beyond said seat ring,
c. said hook portion has a smoothly curved shape turned outwardly relative to said flow passageway and turned generally toward said seat ring, and
d. said first named recess has an inner relief portion therein on the portion thereof closest to said seat ring, said inner relief portion being constructed and adapted to receive a portion of said hook portion.

10. The gate valve of claim 7, wherein:
a. said retainer member one end portion is welded to said seat ring,
b. said retainer member has an essentially straight mid-portion extending over said recess and beyond said seat ring, and
c. said hook portion has an outwardly turned portion extending substantially perpendicular to said retainer straight mid-portion and engageable in said recess.

11. A gate valve, comprising:
a. a gate valve body having an annular seat pocket around a flow passageway and a gate movably mounted in said gate valve body for movement between open and closed positions relative to said flow passageway,
b. an annular seat ring mounted in said annular seat pocket having an inner peripheral surface forming a continuation of the flow passageway and having an annular sealing portion on one side thereof in contact with said gate, an annular recess in said valve body flow passageway in a closely spaced generally parallel relation to said seat pocket, and
c. an elongate clip having one end secured to the inner peripheral surface of the seat ring and extending longitudinally within the flow passageway from the seat ring to the annular recess, the other end of said clip being free and having an outwardly turned hook portion therein fitting within the annular recess to retain the seat ring in the seat pocket.

12. A gate valve as set forth in claim 11 wherein:
a. said seat ring has an annular groove formed in its inner peripheral surface, said clip being secured to said inner peripheral surface of the seat ring at a position to span the annular groove in the ring, said clip being flexible and being depressed outwardly into said groove upon the application of a predetermined outward force at the groove for inward movement and release of said hook portion from its recess.

13. A gate valve as set forth in claim 11 wherein:
a. said clip is flexible and said hook portion is depressed inwardly by the valve body adjacent the seat pocket upon initial insertion of the seat ring and snaps outwardly into engagement with said annular recess when transversely aligned with said groove.

14. A gate valve as set forth in claim 13 wherein:
a. said seat ring has a plurality of clips spaced circumferentially about the inner peripheral surface thereof.

* * * * *